E. G. BUSSE.
THIRD POINT SUPPORT FOR BRAKE BEAMS.
APPLICATION FILED MAY 23, 1913.
1,082,495.
Patented Dec. 30, 1913.
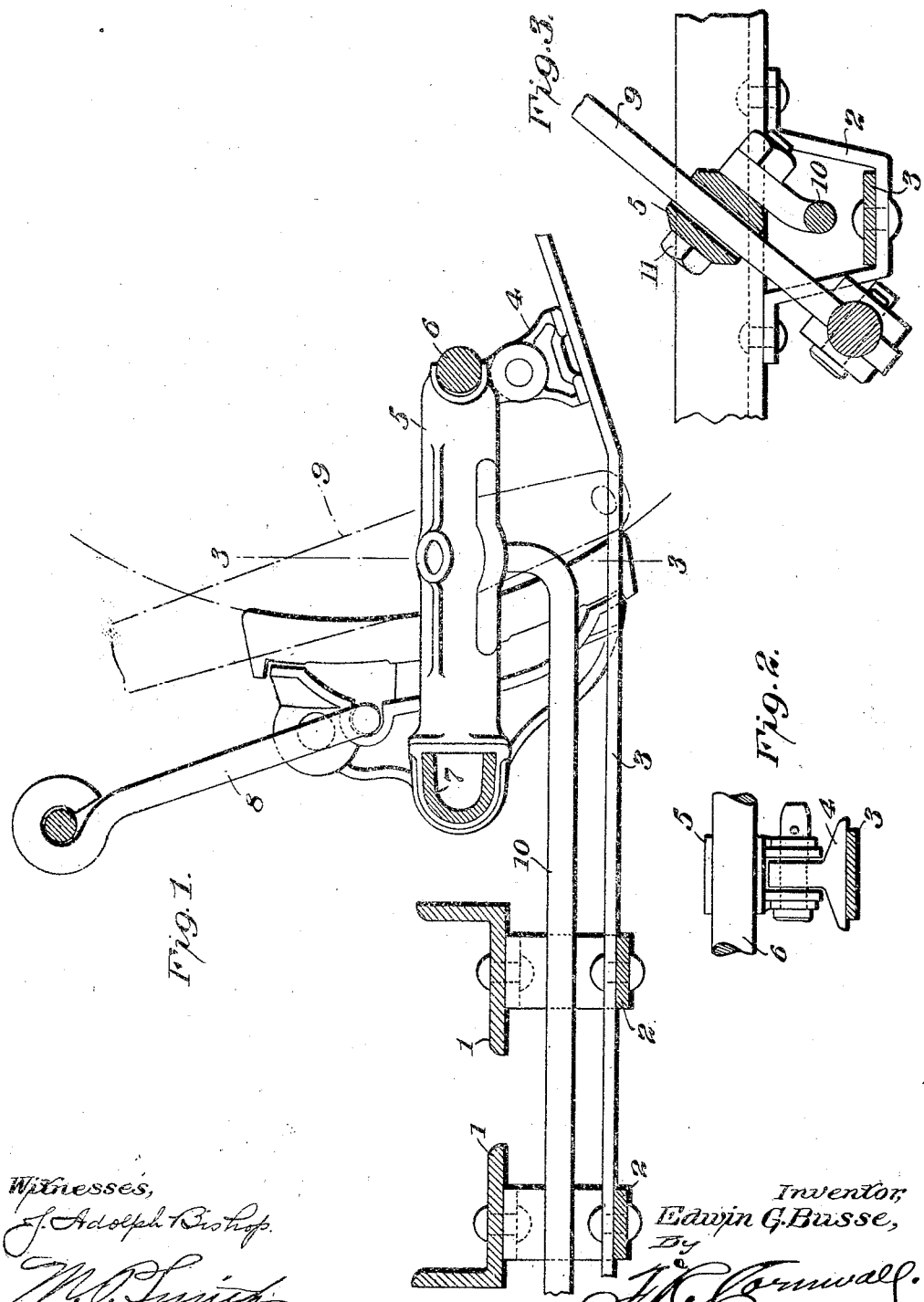
Witnesses,
J. Adolph Bishop.
M. P. Smith
Inventor,
Edwin G. Busse,
By J. W. Cornwall,
Atty.

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

THIRD-POINT SUPPORT FOR BRAKE-BEAMS.

1,082,495.   Specification of Letters Patent.   Patented Dec. 30, 1913.

Application filed May 23, 1913. Serial No. 769,397.

*To all whom it may concern:*

Be it known that I, EDWIN G. BUSSE, a citizen of the United States, residing at city of Chicago, State of Illinois, have invented a certain new and useful Improvement in Third-Point Supports for Brake-Beams, of which the following is a full, clear, and exact description, such as will enable others skilled in the art to which it appertains to make and use the same, reference being had to the accompanying drawings, forming part of this specification, in which—

Figure 1 is a side elevational view of my improved third point support for brake beams. Fig. 2 is a detail view of a shoe which coöperates with the third point support. Fig. 3 is a sectional view on line 3—3 of Fig. 1.

This invention relates to a new and useful improvement in third point supports for brake beams, the object being to space the third point support from the spring plank so as to provide an opening for the passage of the slack adjuster rod. Heretofore, the method of supporting the third point support or inclined track has been to bolt or rivet the same directly against the underside of the spring plank and when so mounted the inclined supporting spring was in the way of slack adjusting mechanism employed on certain railroads.

In the drawings, 1 indicates the spring plank and 2 are brackets depending therefrom, to which brackets is secured by rivets or bolts the third point supporting spring 3 whose outer ends are bent upwardly to form inclined tracks upon which rides the shoe 4 pivotally mounted upon the nose of the strut 5 of the brake beam. 6 is the tension member of said beam, and 7 is the compression member.

8 is the brake hanger, and 9 is the brake lever.

10 indicates a rod extending from a slack adjusting mechanism, not shown, to the pin 11 passing through the strut of the brake beam and upon which the brake lever 9 is pivotally mounted. This slack adjuster rod, as shown, extends parallel to and above the third point supporting spring 3, said rod passing through the brackets 2 and under the spring plank 1. By thus depressing the third point supporting spring, I am enabled to provide a space for the slack adjuster rod and still utilize all of the elements entering into the third point support for the brake beam.

What I claim is:

1. The combination of a spring plank, a third point supporting spring, and brackets depending from said spring plank upon which said third point supporting spring is mounted and by which it is spaced from said spring plank.

2. The combination of a spring plank, brackets depending therefrom, a third point supporting spring mounted upon said bracket, and a slack adjuster rod arranged between said third point supporting spring and said spring plank.

3. The combination of a spring plank, open brackets depending therefrom, a third point supporting spring mounted on said brackets and having its ends inclined upwardly, a brake beam having a shoe which coöperates with the inclined end of said spring, and a slack adjuster rod secured to said brake beam and extending parallel to said third point supporting spring being located therebetween and said spring plank.

In testimony whereof I hereunto affix my signature in the presence of two witnesses, this 20th day of May, 1913.

EDWIN G. BUSSE.

Witnesses:
 E. T. WALKER,
 M. F. HUNTOON.